J. SURPRISE.
TRACK FOR SLIDING DOORS.
APPLICATION FILED SEPT. 6, 1919.
1,352,100.
Patented Sept. 7, 1920.
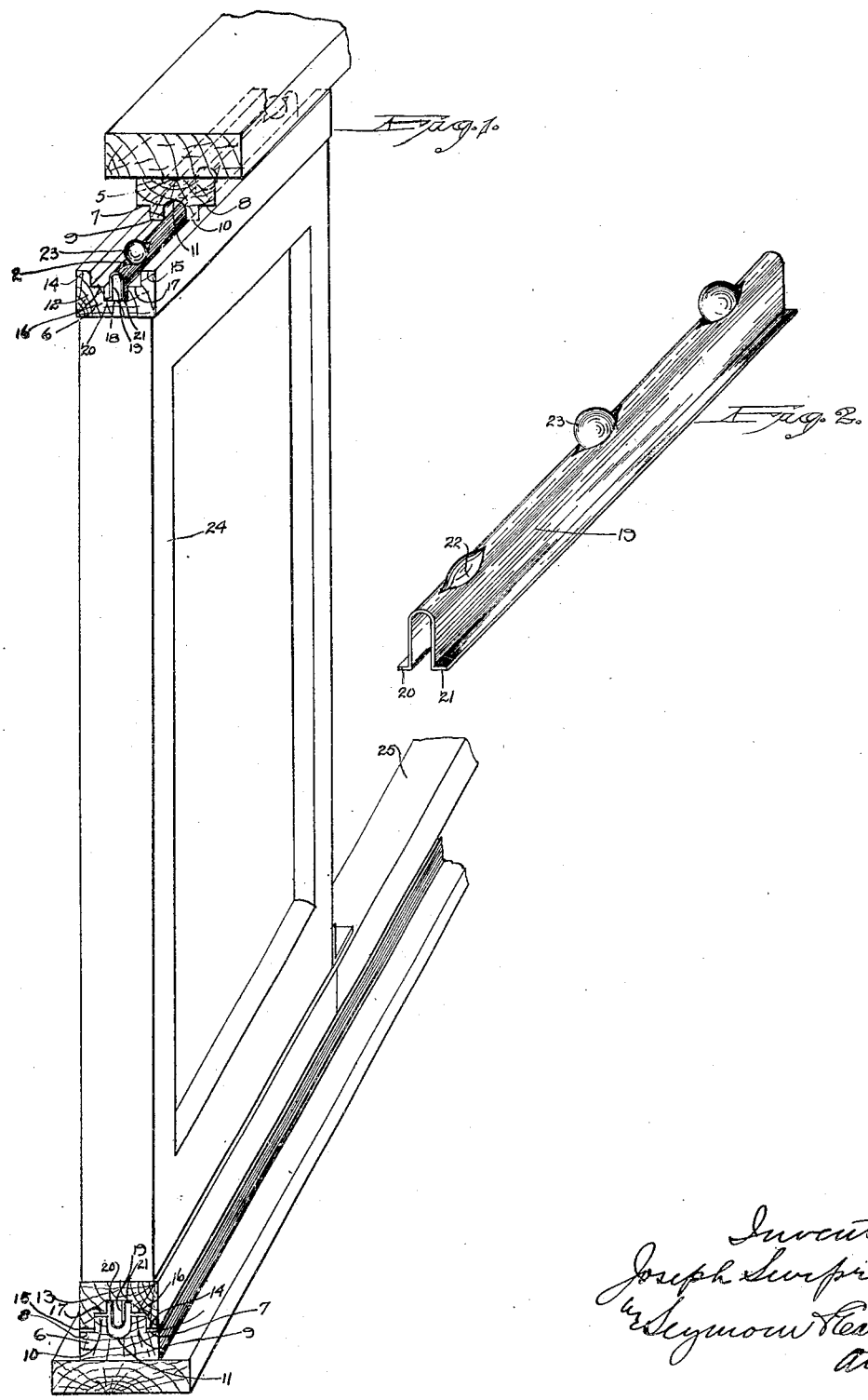

UNITED STATES PATENT OFFICE.

JOSEPH SURPRISE, OF NEW HAVEN, CONNECTICUT.

TRACK FOR SLIDING DOORS.

1,352,100.   Specification of Letters Patent.   Patented Sept. 7, 1920.

Application filed September 6, 1919. Serial No. 322,024.

*To all whom it may concern:*

Be it known that I, JOSEPH SURPRISE, a citizen of the United States, residing at New Haven, in the county of New Haven and State of Connecticut, have invented a new and useful Improvement in Tracks for Sliding Doors; and I do hereby declare the following, when taken in connection with the accompanying drawings and the characters of reference marked thereon, to be a full, clear, and exact description of the same, and which said drawings constitute part of this application, and represent, in—

Figure 1 a perspective view of a door provided at the top and bottom with tracks constructed in accordance with my invention.

Fig. 2 a perspective view of the ball bearing strip, detached.

This invention relates to an improvement in tracks for sliding doors and particularly to tracks which are provided with ball bearings, the object of the invention being to provide tracks for sliding doors which not only have ball bearings but which are so interlocked that they form a weather strip at the tops and bottoms of the doors; and the invention consists in certain details of construction as will be hereinafter described and particularly recited in the claims.

In carrying out my invention I employ a top track 5 and a bottom track 6. These are suitably mounted and include bearing faces 7 and 8, ribs 9 and 10, with a groove 11 between them. The runways 12 and 13 are respectively secured to the top and bottom of the door each comprising bearing edges 14 and 15, corresponding to the bearing faces 7 and 8. The runway is also formed with shoulders 16 and 17 bearing on the ribs 9 and 10, and with a central longitudinal channel 18. In this channel is located a ball-bearing strip 19 struck up from sheet metal substantially U-shaped in cross section with flanges 20 and 21 which closely fit in the bottom of the channel 18 and formed in its outer edge with seats 22 for anti-friction balls 23 which have a bearing in the groove 11. The tracks 5 and 6 are suitably mounted in the pocket for the door and the runways are secured to the top and bottom of the door 24. At the bottom the door rests on the balls located in the ball bearing strip at the bottom of the door and travels over the track 5 at the top of the door, the balls entering the groove 11. By forming the track with the ribs 9 and 10 and the runways with the outwardly projecting bearing edges a close fit may be formed and the doors are so interlocked that they form a weather strip at the top and bottom of the door which, being mounted on ball bearings will ride easily back or forth into it out of the pocket. The bottom track 6 is set in the floor below the threshold and secured to the front edge of the door at the bottom is a threshold strip 25 corresponding to a strip like that of the runway 13 which covers the track and stands flush with the floor or threshold when the door is open.

The track and runways can be readily cast from metal and secured to the door casing and door in any desired manner. The ball bearing strip is preferably struck up from sheet metal so that it may be sprung into the channel 18 and firmly held therein, although it may be interlocked therein if desired.

I claim:—

1. A track for the tops and bottoms of sliding doors formed with longitudinal ribs and with a central longitudinal groove, runways formed with bearing edges for the track, with shoulders to form a bearing for the ribs, and with a central longitudinal channel, a metal U-shaped ball bearing strip located in said channel and extending into said groove and formed with ball seats and balls located in said seats.

2. A track for the tops and bottoms of sliding doors formed with outwardly projecting ribs and a central longitudinal groove, runways comprising bearing edges for the track, shoulders to form a bearing for the ribs, a central longitudinal channel, a U-shaped ball bearing strip located in said channel and formed with ball seats, balls located in said seats, and a threshold strip secured to and projecting from the forward edge of the bottom of the door.

In testimony whereof, I have signed this specification in the presence of two subscribing witnesses.

JOSEPH SURPRISE.

Witnesses:
 FREDERIC C. EARLE,
 CLARA L. WEED.